(12) United States Patent
Searle et al.

(10) Patent No.: US 6,705,309 B2
(45) Date of Patent: Mar. 16, 2004

(54) SELF-HEATING OR SELF-COOLING CONTAINERS

(76) Inventors: Matthew J Searle, 74 High Street, Bruton, Somerset, BA10 0AJ (GB); Robert N Richardson, Brackendale, Sway Road, Brockenhurst, Hampshire, SO42 7SG (GB)

(*) Notice: Subject to any disclaimer, the term of this patent is extended or adjusted under 35 U.S.C. 154(b) by 0 days.

(21) Appl. No.: 09/938,613

(22) Filed: Aug. 27, 2001

(65) Prior Publication Data

US 2002/0017291 A1 Feb. 14, 2002

(30) Foreign Application Priority Data

Feb. 26, 1999 (GB) .............................. 9904357
Feb. 28, 2000 (WO) ............... PCT/GB00/00700

(51) Int. Cl.[7] .................................................. F24J 1/00
(52) U.S. Cl. ......................... 126/263.06; 126/263.09; 62/4; 206/219; 220/521
(58) Field of Search ................ 126/263.03, 263.01, 126/263.05, 263.06, 263.07, 263.08, 263.09, 262; 62/4, 371; 220/500, 521, 523; 206/219, 221, 222; 426/112, 113, 114

(56) References Cited

U.S. PATENT DOCUMENTS

| 2,185,799 A | | 1/1940 | Blake | 126/262 |
|---|---|---|---|---|
| 2,265,172 A | * | 12/1941 | Katz | 126/263.06 |
| 2,623,515 A | | 12/1952 | Sukacev | 126/263.05 |
| 3,094,981 A | * | 6/1963 | Brewer | 126/263.05 |
| 3,970,068 A | | 7/1976 | Sato | 126/263.08 |
| 4,793,323 A | * | 12/1988 | Guida et al. | 126/263.08 |
| 5,626,022 A | * | 5/1997 | Scudder et al. | 126/263.01 |
| 2002/0162549 A1 | * | 11/2002 | Kolb | 126/263.06 |

FOREIGN PATENT DOCUMENTS

| DE | 100 54 727 A1 | * | 5/2002 |
|---|---|---|---|
| EP | 0 255 494 | | 2/1988 |
| EP | 0 815 784 | | 1/1998 |
| FR | 2 665 349 | | 2/1992 |
| JP | 9-25951 A | * | 9/1997 |
| WO | WO93/17928 | | 9/1993 |

* cited by examiner

*Primary Examiner*—Josiah Cocks

(57) ABSTRACT

A self-heating container (10) has an internal cavity (22) for its contents and an external cavity (20) for a heating mechanism, for example, comprised of first and second chemically reactive materials which are arranged to be mixed when heating is required. A closure (30) closes the external cavity (20). When the heating mechanism is operated to mix the chemicals and cause an exothermic reaction, vapor, such as steam and hot air, is produced. The vapor is constrained to flow to the exterior of the closure (30) through grooves (62) therein. A sleeve (60) is arranged around the container (10) contiguous to the closure (30) such that the exiting vapor is constrained to flow between the sleeve (30) and the can (10). By this means, a user of the can is protected from coming into contact with the hot steam and air and the heat in the vapor generated can enhance the heating process. Preferably, the sleeve (60) is constructed of an absorbent material, such as a cardboard, to absorb any condensates and this absorbent material is surrounded by an impermeable plastics material to insulate the user from the heat of the reaction.

16 Claims, 3 Drawing Sheets

Figure 1:
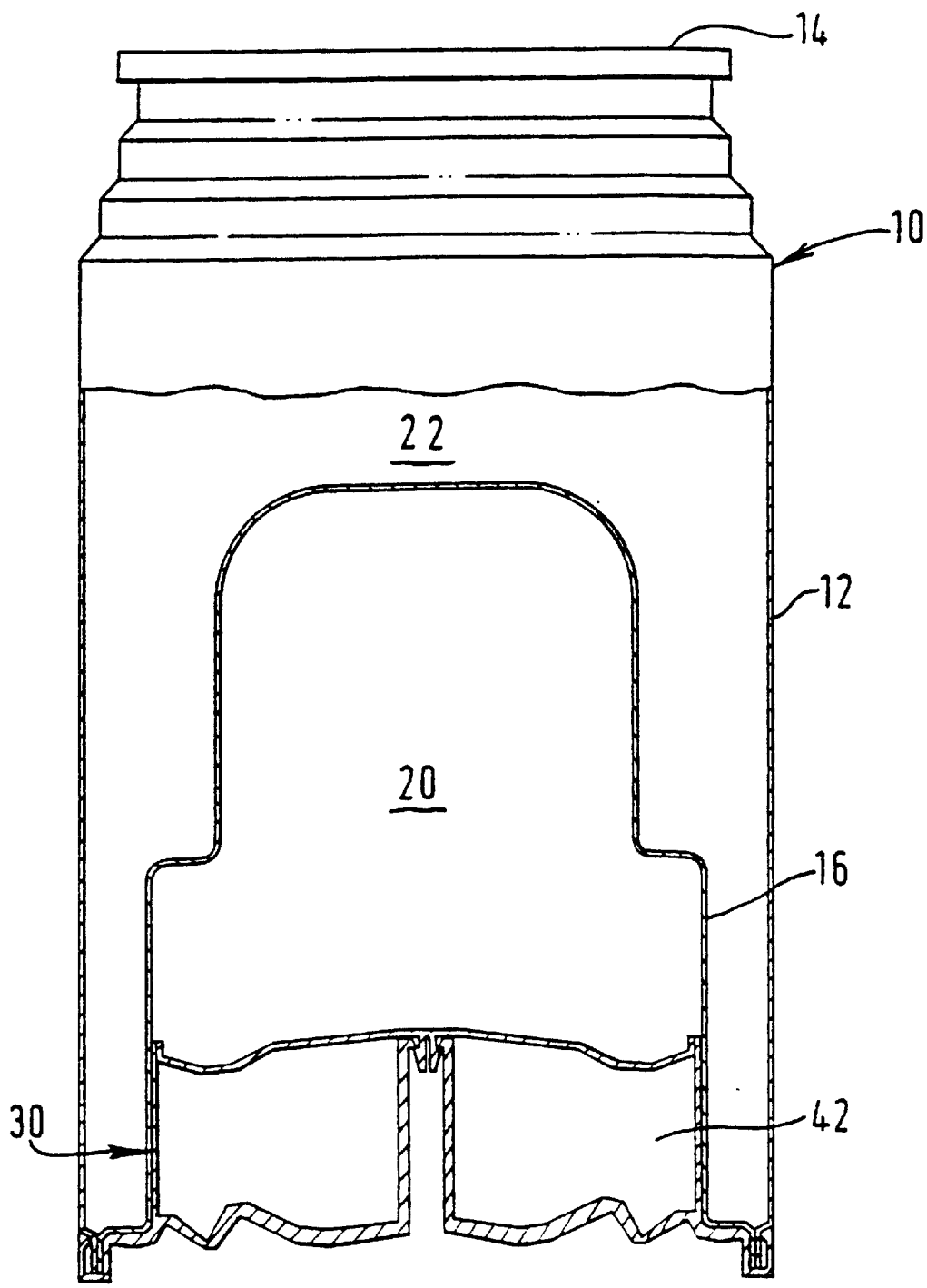

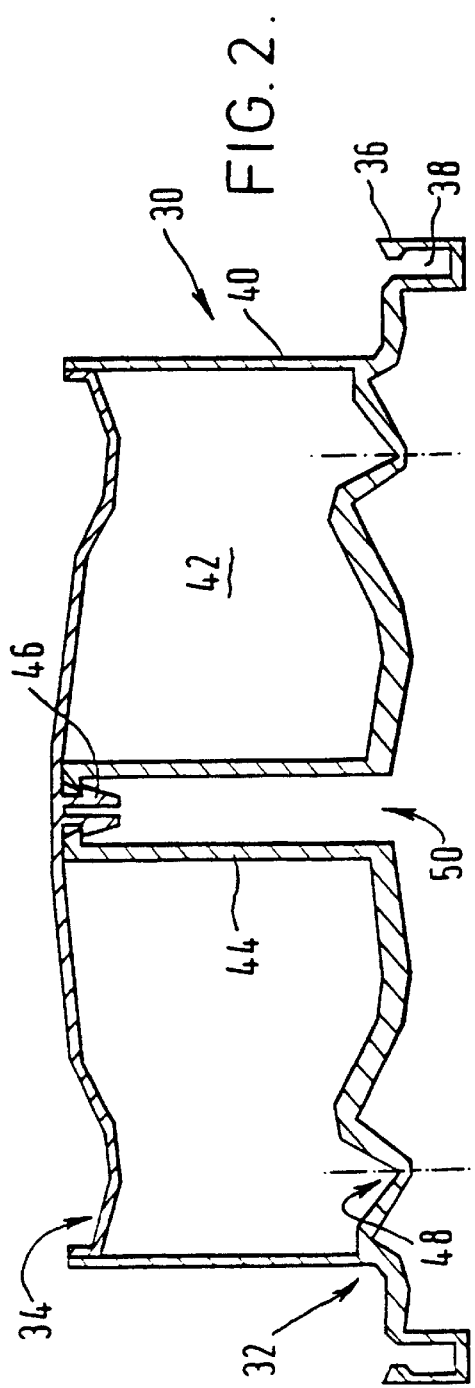
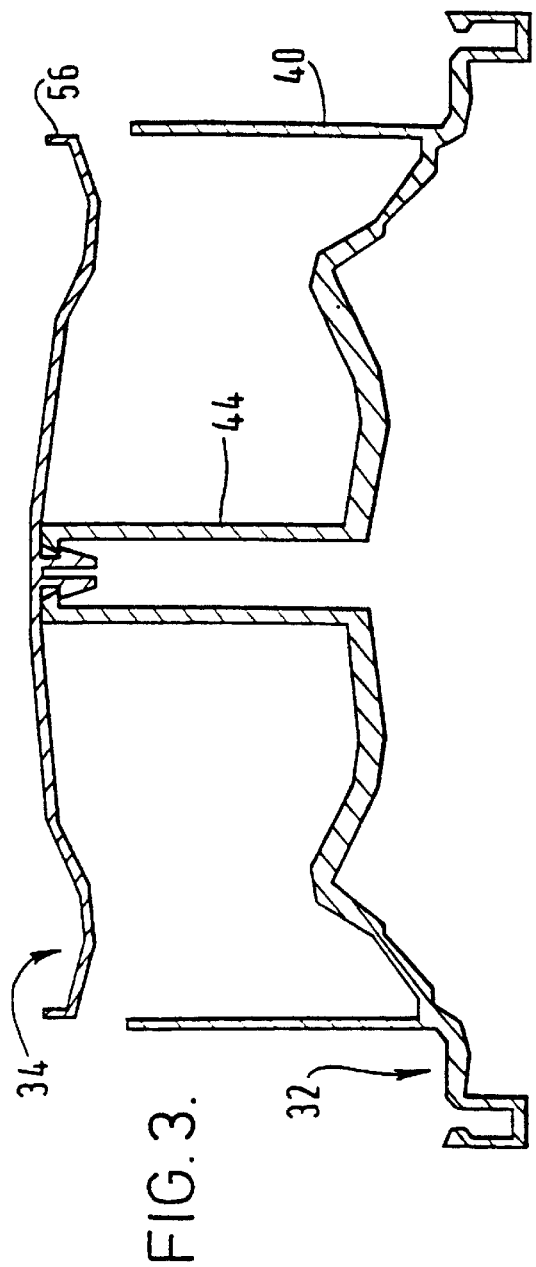

SELF-HEATING OR SELF-COOLING CONTAINERS

The present invention relates to a self-heating or a self-cooling container.

There have been many proposals for self-heating or self-cooling beverage containers. WO 96/29255, for example, discloses a can having the same external dimensions and shape as conventional beverage cans, but having an indented base to define an external cavity in which means to cool or heat the contents of the can are received.

Heating or cooling of the contents of the can can be achieved by using two chemical reactants which are stable when separated, but which produce an exothermic reaction or an endothermic reaction when mixed. U.S. Pat. No. 5,626,022 shows just one example, from many, of an insert for a self-heating or self-cooling can which enables mixing of the reactants when required. This construction, as is common, utilises a breakable or pierceable barrier to separate the two reactants and spikes or other piercing means to break the barrier when their reaction is required to heat or cool the can.

As indicated, self-heating containers may utilise an exothermic reaction as the energy source to heat the contents of the container. Commonly the exothermic reaction uses water as one of the reactants and the reaction produces steam and heated air. To date, that steam and hot air has simply been allowed to escape from the container. This escape is wasteful of the thermal energy which has been developed by the reaction and also presents a potential hazard to the user of the container.

The present invention seeks to reduce the problem with existing proposals discussed above.

According to a first aspect of the present invention there is provided a self-heating or self-cooling container having a tubular peripheral wall within which an internal cavity is defined, a first end member closing one end of the internal cavity, and a second end member closing the other end of the internal cavity, wherein a heating or cooling mechanism is supported by or incorporated within the peripheral wall, the container further comprising a sleeve arranged externally around at least part of the peripheral wall, and the container being arranged and constructed such that vapour generated by said heating or cooling mechanism is guided between the sleeve and said peripheral wall.

With a self-heating or self-cooling container of an embodiment of the invention, vapour produced by the heating or cooling mechanism, for example, a high pressure gas vented by a cooling mechanism, or the steam and/or hot air produced by an exothermic heating reaction, is guided between the sleeve and the wall of the container. This protects the user of the container and also enables the vapour to enhance the heating or cooling process. Thus, where the vapour is generated by a reaction arranged to heat the contents of the can and is therefore hot, the vapour, such as steam, is passed between the sleeve and the peripheral wall to provide a further heating effect to the contents of the container.

Preferably, the sleeve is absorbent such that the vapour is absorbed therein. Additionally and or alternatively, the sleeve is thermally insulating whereby the sleeve continues to protect the user from the heat or cool of the container, for example, if the user handles the container.

It will be appreciated that a self-heating or a self-cooling container of an embodiment of the invention may incorporate any heating or cooling mechanism. Various arrangements are described, for example, in WO96/29255. In a preferred embodiment, the heating or cooling mechanism comprises a first chemical reactant and a second chemical reactant received within an external cavity of the container defined, for example, by the second end member. The chemical reactants are kept apart until heating or cooling of the contents of the container is required.

Preferably, the longitudinal extent of the sleeve is the same or similar to the longitudinal extent of the peripheral wall.

In an embodiment, the internal surface of said sleeve and/or the external surface of the peripheral wall is channelled or grooved to guide the vapour along the external surface of the peripheral wall.

The sleeve preferably comprises an absorbent material.

In one advantageous embodiment, the sleeve is comprised of, or incorporates, a sleeve of cardboard, the internal surface of said cardboard sleeve being corrugated.

Preferably, the external surface of the sleeve is made of an impermeable material.

For example, the sleeve may have a layered or laminated construction, and in this case a layer of an absorbent material may define the internal surface of the sleeve, and a layer of an impermeable material may define the external surface of the sleeve.

Alternatively, the sleeve may comprise at least a first sleeve of an absorbent material arranged around said peripheral wall, and a second sleeve of an impermeable material arranged around said first sleeve.

In a preferred embodiment, the internal surface of the sleeve is made of an absorbent non-woven material, and the external surface of said sleeve is made of a plastics material with structural rigidity. For example, the plastics material is expanded polystyrene.

Such a sleeve construction is preferably made from a single web of material constructed by laminating a layer of any non-woven material, which is preferably absorbent, with a facing of expanded polystyrene. The polystyrene facing insulates a user from the heat or cold of the container contents and provides structural rigidity to the sleeve.

The external surface of the sleeve may be printed to act as a label and/or to add colour and design to the exterior of the container.

In an embodiment, the container further comprises vapour guide means for guiding the vapour generated by said heating or cooling mechanism between the sleeve and said peripheral wall, said vapour guide means comprising channels and/or grooves for the vapour defined by or in the peripheral wall and/or by or in the second end member.

Preferably, the second end member is incorporated, at least in part, in said heating or cooling mechanism, wherein vapour generated is arranged to exit from an external periphery of said second end member, and wherein said sleeve is arranged contiguous to the external periphery of said second end member.

For example, grooves and/or channels may be provided in said second end member to guide vapour to the external periphery thereof.

In a preferred embodiment, the internal cavity is for receiving the contents of the container, and the second end member comprises a base member which is indented to define an external cavity which extends within the peripheral wall but is separated from the internal cavity, said second end member further comprising a closure of said external cavity, said closure having operating means to actuate said heating or cooling mechanism An example of such a construction is described in copending International application No. PCT/GB99/04241.

Preferably, the closure is provided with a peripheral rim which is appropriately shaped to clip onto the peripheral wall to close the external cavity.

In an embodiment, both the peripheral wall and said closure have a substantially circular periphery, and the closure has an annular peripheral rim which defines an annular groove receiving an edge of the peripheral wall.

In this respect, the container will generally have a circular cross-section, although the invention is applicable to containers of any shape.

Preferably, the operating means comprises a plunger affixed to said closure and upstanding therefrom. For example, the plunger may be integrally formed with the closure. In an embodiment, the plunger is mounted on the closure by way of a button formed in the closure.

Figure 4:
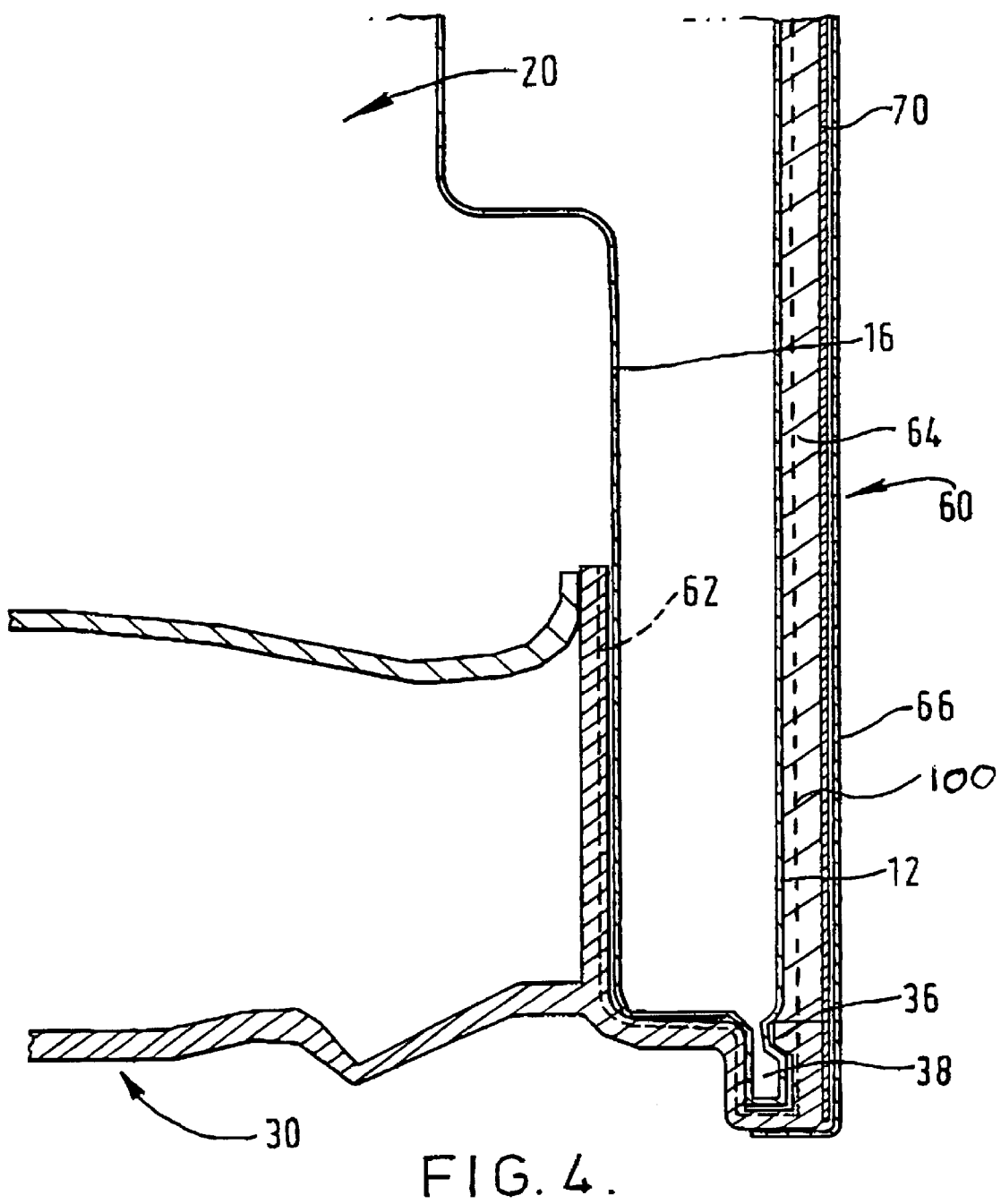

Embodiments of the present invention will hereinafter be described, by way of example, with reference to the accompanying drawings, in which:

FIG. 1 shows, partly in section, a self-heating or a self-cooling container illustrating an external reactant cavity thereof and a closure for the cavity, FIG. 2 shows a larger view of the closure in its closed position, FIG. 3 shows the closure of FIG. 2 after opening thereof, and FIG. 4 shows an enlarged view of a self-heating or self-cooling container provided with an insulating and/or absorbent sleeve.

The invention is described hereinafter with reference to a self-heating beverage container having a particular design of heating mechanism. However, the invention is applicable to both self-heating and self-cooling containers and finds application irrespective of the proposed contents of the container. As described, the container has an external cavity in which heating or cooling means is received, the external cavity being closed by a closure. The invention is not limited to such an arrangement and can be used with other constructions of self-heating or self-cooling mechanisms.

The container shown in FIG. 1 may be a metal or plastics material beverage container 10 having a substantially cylindrical peripheral wall 12 which is closed at one end by a top end member 14. As described in WO 96/29255, a base end member 16 of the container is indented to define an elongate external cavity 20 which extends within the peripheral wall 12. It will be appreciated that the peripheral wall 12 and the top and base members 14 and 16 of the container together define an internal cavity 22 in which the beverage is received. It will be seen that the external cavity 20 extends within this internal cavity 22, but is separated therefrom by the wall of the base member 16.

The container 10 illustrated in FIG. 1 is configured to have the same external dimensions and shape as a conventional beverage can. This means that the can can be filled and treated on existing filling lines.

The external cavity 20 of the can 10 is to be utilised to contain a heating mechanism. In the embodiment shown, the heating mechanism comprises a first reactant material, which, for example, may be quicklime (calcium oxide). The cavity 20, incorporating the quicklime, is closed by a closure 30. For the self-heating can this closure 30 may contain water.

When it is required to heat the contents of the can 10, the can is inverted and stood on its top member 14 so that the base of the closure 30 is accessible. A button, described below, on the bottom of the base is depressed whereby a water chamber 42 within the closure 30 is opened so that water from the closure 30 flows over the quicklime in the reactant cavity 20 to cause the exothermic reaction. The steam which is generated exits from the cavity 20 around the periphery of the closure 30 through vents or recesses (not shown) formed in either the periphery of the closure 30 or in the wall of the cavity 20 or in both. The user will retain the can in its inverted position until the exit of steam from the cavity 20 has been completed. At this stage the contents of the can will have been heated to a satisfactory temperature.

FIG. 2 shows the closure 30. In the embodiment illustrated, the closure 30 defines a container for the water, as well as closing the cavity 20. The closure 30 is moulded from plastics material and comprises a base member generally indicated as 32 and a lid generally indicated as 34. The base member 32 comprises a substantially circular base having an annular peripheral rim 36. This rim defines an annular recess 38 which enables the closure 30 to be clipped onto the base of the can 10. Radially inwardly of the peripheral rim 36 is an upstanding peripheral wall 40 which defines the generally cylindrical chamber 42 for containing the water. The free end of the wall 40 defines a circular opening of the chamber 42 in which the lid 34 is received. At its centre, the base 32 has an upstanding plunger 44. In the embodiment illustrated, this plunger 44 has an open top end for receiving a fixing 46 of the lid 34.

The plunger 44 is affixed to the base centrally of a button 50 defined within the base 32 by an annular groove 48. It will be seen that in the condition shown in FIG. 2, the button 50 is convex and is radially inwardly of the annular groove 48.

The fixing 46 of the lid 34 comprises downwardly extending projections 46 which are clipped into the top of the plunger 44 after the chamber 42 has been filled with water. It will be seen that the lid 34 also has an upstanding rim 56 (FIG. 3) which, when the lid 34 is snap fitted into position, is received within the opening defined by the upstanding wall 40. The lid 34 is also shaped radially inwardly of the rim 56 in a manner such that any pressure generated within the chamber 42 tends to force the rim 56 into tighter contact with the internal surface of the opening of the chamber 42. If required circumferentially extending ribs (not illustrated) may be formed on the exterior of the rim 56, such that they thereby come into contact with the internal surface of the opening of the chamber 42. It has been found that such circumferential ribs prevent capillary action, and hence leaking of water from the chamber 42.

It has been found that where the lid 34 is a good snap fit within the opening of the chamber 42, leakage of water from the closure during normal transport and handling does not occur. Thus, when a closure as 30 is clipped onto a can 10 as shown in FIG. 1 it acts to keep the quicklime within the cavity 20 and to retain the water in the chamber 42 but reliably separated from the quicklime.

When self-heating of the can 10 is required it is inverted as described above. The button 50 is pressed. The button 50 is arranged to have an over-centre action such that, as indicated in FIG. 3, on depression, the button moves from its initial convex domed position to a substantially concave domed position. Preferably, the button is stable in both of its states. This movement of the button 50 moves the plunger 44 in a direction to push the lid 34 out of the opening of the chamber 42. Generally, it is expected that depression of the button 50 will cause a positive opening of the lid 34 of the chamber 42 whereby water is quickly released into the quicklime of the cavity 20 to commence the self-heating reaction. However, because the container 10 is inverted, it does not matter if positive and full opening of the lid does not occur. In this respect, as long as there is some opening of the lid, flow of the water from the chamber 42 will begin and this will, in itself, tend to ensure fuller opening of the lid.

It is not necessary for the lid 34 to be fixed at its centre to the plunger 44 although this does make a particularly secure and robust construction. Thus, the plunger may simply abut the lid in the closed position of FIG. 2.

The contents of the chamber 42 are, if the lid 34 is held captive to the plunger 44 as in the illustrated embodiment, confined to run out from the chamber 42 around the periphery of the lid 34. This makes the illustrated container suitable for use only with materials which flow, for example liquids, powders and other fluids.

The self-heating container described and illustrated can be filled on conventional filling lines, and the contents thereof may be subjected to any treatments required. Thereafter, it is a simple matter to invert each completed and filled container, fill its external cavity with an appropriate charge of quicklime, and then clip on a closure which is already filled with water. Generally, it is preferred to simply clip the closure 30 onto the container 10, but it would be possible to adhere or seal it into position if preferred.

When the closure 30 is subsequently opened to commence the reaction to heat the container, it is possible for water to be pushed out of the cavity 20 towards the rim 36 of the closure. Whilst it is required to have a pathway to vent air and steam, it is not generally required for any water to leak out, even at this stage. Accordingly, a wick, gasket or washer, or semi-permeable membrane (not shown) may be housed in the annular recess 38 or sited around the wall 40 of the closure 30. Additionally and/or alternatively, the closure 30 may be a tight fit on the container, and micro grooves (not shown) may be in the annular recess 38 and/or around the wall 40. If the micro grooves are of the order of 6 thou to 10 thou (thousandths of an inch) they will allow air and steam to vent, but not allow the escape of water.

The embodiment described above employs a particular form of closure 30 configured as a fluid container. In an alternative embodiment, the fluid container may be omitted, for example, by omitting the upstanding wall 40 and the lid 34. The base 32 then forms a closure able to clip onto the can 10 to close the external cavity 20 therein. Appropriate heating means, for example, are provided within the external cavity 20. Such a closure may be provided with a button as 50, and/or with a plunger as 44 to operate the heating means provided.

It will be appreciated that steam and hot air are created by the chemical reaction and that means are provided to vent those gases from the external cavity 20. However, it is a waste of the thermal energy which has been created if the vapour created is simply vented to atmosphere. What is more, the steam and hot air exiting from the chemical reaction can be a serious hazard to a user of the container.

FIG. 4 shows an enlarged view of part of the container of FIG. 1 showing the provision of a sleeve 60 which, as will be seen, removes the hazard to the user from the hot vapours generated by the chemical reaction and also enables the thermal energy in those vaporous products to be used in the heating of the contents of the container.

It will be seen in FIG. 4 that the base edge of the peripheral wall 12 of the container is received within the annular recess 38 of the closure 30. In this respect, and as described above, the peripheral rim 36 of the closure 30 engages with the base edge of the wall 12 of the container. However, in the embodiment of FIG. 4, the peripheral rim 36 of the closure has been made thicker such that it protrudes radially of the external surface of the peripheral wall 12. The sleeve 60, therefore, can be placed in position around the exterior surface of the peripheral wall 12 and in abutment with the radially extending top surface of the rim 36.

It will be appreciated that upon operation of the self-heating can, as described above, to cause the exothermic reaction, steam and hot gases from the reaction may pass between the closure 30 and the inner surface of the base member 16 such that they flow by way of the annular recess 38 to the exterior of the peripheral wall 12 and hence are received between the sleeve 60 and the peripheral wall 12. In addition, in the embodiment shown in FIG. 4, grooves 62 are provided within the closure 30 to facilitate the passage of the steam and air.

The passage of the steam and air between the sleeve 60 and the exterior of the container as described clearly protects a user of the can from contact with the steam and air. What is more, the flow of the steam and air along the external surface of the container 10 will put the hot steam and air around the contents of the can which are to be heated, and thereby enhances the heating effect from the chemical reaction.

The sleeve 60 is arranged to enable the steam and air to flow along the length of the external surface of the can 10. Preferably, the sleeve 60 is also arranged to absorb condensates from the steam and air.

In the embodiment illustrated, the sleeve 60 is made from two layers. The inner layer 64 is of corrugated cardboard. It will be appreciated that the corrugations provide channels for the steam and air whilst the cardboard is absorbent and absorbs the condensates. The outer layer 66 is of a plastics material which has some structural rigidity. The outer layer 66, therefore, is able to insulate the heat from the user and also provide an impermeable and rigid outer finish to the package.

In a preferred embodiment, the outer layer 66 is expanded polystyrene. The outer layer 66 may incorporate printing or other artwork or a further artwork sleeve may be applied thereto.

If required, and as indicated in FIG. 4, an intermediate thermal barrier 70 may be provided between the outer sleeve 66 and the inner sleeve 64.

It will be appreciated that the construction and the materials of the sleeve 60 may be chosen as required. Generally, it will be required that channels 100 for the passage of vapours between the sleeve and the can are provided, but these could be mechanically formed in either the sleeve or the can if required. For the most part, it is preferred that the materials of the sleeve have some absorbency so that condensates are absorbed rather than collecting as liquid, for example. It is necessary that the sleeve have thermal properties as it is required to keep the heat from the heating reaction within the contents of the can and to remove it from the user of the can. Obviously, the sleeve may be made up of a number of sleeves arranged one over the other or the sleeve may have a laminated construction.

It will be appreciated that modifications to or variations of the embodiments described and illustrated may be made within the scope of the appended claims.

What is claimed is:

1. A self-heating or self-cooling container having a tubular peripheral wall within which an internal cavity is defined, a first end member closing one end of the internal cavity, and a second end member closing the other end of the cavity, wherein a heating or cooling mechanism is supported by or incorporated within the peripheral wall, the container further comprising a sleeve arranged externally around at least part of the peripheral wall, and the container being arranged and constructed such that vapour generated by said heating or cooling mechanism is guided between the sleeve and said peripheral wall, wherein the internal cavity is for receiving the contents of the container, wherein the second end member comprises a base member which is indented to define an external cavity which extends within the peripheral wall but is separated from the internal cavity, and wherein said second end member further comprises a closure of said external cavity, said closure having operating means to actuate said heating or cooling mechanism and wherein said sleeve has a layered or laminated construction, a layer of an absorbent material defining the internal surface of the sleeve, and a layer of an impermeable material defining the external surface of the sleeve.

2. The self-heating or self-cooling container of claim 1, wherein the sleeve is thermally insulating.

3. The self-heating or self-cooling container of claim 1, wherein the longitudinal extent of said sleeve is the same or similar to the longitudinal extent of the peripheral wail.

4. The self-heating or self-cooling container of claim 1, wherein the internal surface of the said sleeve and/or the external surface of the peripheral wall is channelled or grooved to guide the vapour along the external surface of the peripheral wall.

5. The self-heating or self-cooling container of claim 1, wherein the sleeve is comprised of or incorporates, a sleeve of cardboard, the internal surface of said cardboard sleeve being corrugated.

6. The self-heating or self-cooling container of claim 1, further comprising vapour guide means for guiding the vapour generated by said heating or cooling mechanism between the sleeve and the peripheral wall, said vapour guide means comprising channels and/or grooves for the vapour defined by or in the peripheral wall and/or by the second end member.

7. The self-beating or self-cooling container of claim 6, wherein said second end member is incorporated at least in part, in said heating or cooling mechanism, wherein vapour generated is arranged to exit from an external periphery of said second end member, and wherein said sleeve is arranged contiguous to the external periphery of said second end member.

8. The self-heating or self-cooling container of claim 7, wherein grooves and/or channels are provided in said second end member to guide vapour to the external periphery thereof.

9. The self-heating or self-cooling container of claim 1, wherein said closure is provided with a peripheral rim which is appropriately shaped to clip onto the peripheral wall to close the external cavity.

10. The self-heating or self-cooling container of claim 1, wherein both the peripheral wall and said closure have a substantially circular periphery, and wherein the closure has an annular peripheral rim which defines an annular groove receiving an edge of the peripheral wall.

11. The self-heating or self-cooling container of claim 1, wherein said operating means comprises a plunger affixed to said closure and upstanding therefrom.

12. The self-heating or self-cooling container of claim 11, wherein the plunger is integrally formed with the closure.

13. The self-heating or self-cooling container of claim 12, wherein the plunger is mounted on the closure by way of a button formed in the closure.

14. A self-heating or self-cooling container having a tubular peripheral wall within which an internal cavity is defined, a first end member closing one end of the internal cavity, and a second end member closing the other end of the cavity, wherein a heating or cooling mechanism is supported by or incorporated within the peripheral wall, the container further comprising a sleeve arranged externally around at least part of the peripheral wall, and the container being arranged and constructed such that vapour generated by said heating or cooling mechanism is guided between the sleeve and said peripheral wall, wherein the internal cavity is for receiving the contents of the container, wherein the second end member comprises a base member which is indented to define an external cavity which extends within the peripheral wall but is separated from the internal cavity, and wherein said second end member further comprises a closure of said external cavity, said closure having operating means to actuate said heating or cooling mechanism, and wherein said sleeve comprises at least a first sleeve of an absorbent material arranged around said peripheral wall, and a second sleeve of an impermeable material arranged around said first sleeve.

15. A self-heating or self-cooling container having a tubular peripheral wall within which an internal cavity is defined, a first end member closing one end of the internal cavity, and a second end member closing the other end of the cavity, wherein a heating or cooling mechanism is supported by or incorporated within the peripheral wall, the container further comprising a sleeve arranged externally around at least part of the peripheral wall, and the container being arranged and constructed such that vapour generated by said heating or cooling mechanism is guided between the sleeve and said peripheral wall, wherein the internal cavity is for receiving the contents of the container, wherein the second end member comprises a base member which is indented to define an external cavity which extends within the peripheral wall but is separated from the internal cavity, and wherein said second end member further comprises a closure of said external cavity, said closure having operating means to actuate said heating or cooling mechanism, and wherein the internal surface of said sleeve is made of an absorbent non-woven material, and the external surface of said sleeve is made of a plastics material with structural rigidity.

16. A self-heating or self-cooling container of claim 15, wherein said plastics material is expanded polystyrene.

* * * * *